United States Patent
Kim

(10) Patent No.: US 10,285,153 B2
(45) Date of Patent: May 7, 2019

(54) METHOD AND APPARATUS FOR TRANSMITTING POSITIONING REFERENCE SIGNAL

(71) Applicant: Industry-University Cooperation Foundation Hanyang University, Seoul (KR)

(72) Inventor: Sun Woo Kim, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 15/526,184

(22) PCT Filed: Nov. 12, 2015

(86) PCT No.: PCT/KR2015/012173
§ 371 (c)(1),
(2) Date: May 11, 2017

(87) PCT Pub. No.: WO2016/076644
PCT Pub. Date: May 19, 2016

(65) Prior Publication Data
US 2017/0318554 A1    Nov. 2, 2017

(30) Foreign Application Priority Data

Nov. 12, 2014  (KR) .......................... 10-2014-0156924
Nov. 12, 2014  (KR) .......................... 10-2014-0156928
Nov. 12, 2015  (KR) .......................... 10-2015-0158862

(51) Int. Cl.
*H04W 64/00*      (2009.01)
*G01S 5/02*       (2010.01)
(Continued)

(52) U.S. Cl.
CPC ............... *H04W 64/00* (2013.01); *G01S 1/20* (2013.01); *G01S 5/0236* (2013.01); *G01S 5/10* (2013.01)

(58) Field of Classification Search
CPC ...................................................... H04W 64/00
(Continued)

(56) References Cited

U.S. PATENT DOCUMENTS

| | | | |
|---|---|---|---|
| 2012/0165053 A1* | 6/2012 | Yoon ...................... | H04L 5/0048 455/501 |
| 2013/0267246 A1* | 10/2013 | Wang ..................... | H04W 24/10 455/456.1 |
| 2014/0094188 A1* | 4/2014 | Kazmi .................... | G01S 5/0242 455/456.1 |

FOREIGN PATENT DOCUMENTS

| KR | 10-2010-0105347 A | 9/2010 |
|---|---|---|
| KR | 10-2010-0113023 A | 10/2010 |

(Continued)

OTHER PUBLICATIONS

International Search Report for PCT/KR2015/012173 dated Feb. 29, 2016 [PCT/ISA/210].

*Primary Examiner* — Michael T Vu
(74) *Attorney, Agent, or Firm* — Sughrue Mion, PLLC

(57) ABSTRACT

The present invention relates to a technology for estimating a position of a terminal using a positioning reference signal. More specifically, the present invention relates to a method and apparatus for controlling a transmission period or transmission power of a positioning reference signal in order to accurately measure a position of a terminal. In particular, the present invention provides a method and apparatus for estimating a position of a terminal, the method comprising the steps of: receiving a positioning reference signal from each of a serving cell and one or more neighboring cells; generating reference signal time difference (RSTD) infor- (Continued)

mation on the basis of information on a reception time of the positioning reference signal; and estimating a position of a terminal on the basis of the RSTD information.

9 Claims, 8 Drawing Sheets

(51) Int. Cl.
  *G01S 5/10* (2006.01)
  *G01S 1/20* (2006.01)
(58) Field of Classification Search
  USPC .......................................... 455/456.1–456.5
  See application file for complete search history.

(56) References Cited

FOREIGN PATENT DOCUMENTS

| KR | 10-2012-0008431 A | 1/2012 |
| KR | 10-2014-0081498 A | 7/2014 |
| KR | 10-2014-0089249 A | 7/2014 |

* cited by examiner

METHOD AND APPARATUS FOR TRANSMITTING POSITIONING REFERENCE SIGNAL

TECHNICAL FIELD

The present invention relates to a technology for estimating a position of a terminal based on a positioning reference signal. More particularly, the present invention relates to a method and an apparatus for controlling a transmission period and transmission power of a positioning reference signal to accurately measure a position of a terminal.

BACKGROUND ART

According to the development of a communication system, consumers such as companies and individuals have demanded wireless terminals that support various services.

Current mobile communication systems such as 3GPP, LTE (Long Term Evolution), and LTE-A (LTE-Advanced) correspond to high-speed and large-capacity communication systems capable of transmitting and receiving various pieces of data such as images and wireless data beyond a voice-centered service, wherein the development of technology for transmitting large-capacity data like a wired communication network is required, and a proper error detection scheme for minimizing loss of information and increasing system transmission efficiency, so as to improve system performance is necessarily needed.

Further, various current communication systems propose several reference signals to provide information on a communication environment to a counterpart device through an uplink or a downlink.

In order to measure a position of a User Equipment (UE), each cell or BS transmits a Positioning Reference Signal (PRS) to the UE and the corresponding UE receives the positioning reference signal transmitted from each BS at a particular time and measures the position.

However, it is difficult to measure an accurate position through the conventional measurement of the position of the UE using the positioning reference signal when the UE is located indoors or when reception of the positioning reference signal is difficult.

DETAILED DESCRIPTION OF THE INVENTION

Technical Problem

The present invention made from the above-described background proposes a method and an apparatus for setting transmission parameters to measure an accurate position by a UE based on positioning reference signals.

Further, the present invention proposes a method and an apparatus for controlling positioning reference signals to measure an accurate position when a UE is located indoors.

Technical Solution

In accordance with an aspect of the present invention, a method of estimating a position of a UE is provided. The method includes: receiving positioning reference signals from a serving cell and each of one or more neighboring cells; generating Reference Signal Time Difference (RSTD) information based on reception time information of the positioning reference signals; and estimating the position of the UE based on the reference signal time difference information.

In accordance with another aspect of the present invention, a UE for estimating a position is provided. The UE includes: a receiver configured to receive reference signals from a serving cell and each of one or more neighboring cells; and a controller configured to generate Reference Signal Time Difference (RSTD) information based on reception time information of the positioning reference signals and estimate the position of the UE based on the reference signal time difference information.

Effects of the Invention

According to the present invention, there is an effect of providing a method and an apparatus for setting transmission parameters to measure an accurate position by a UE based on positioning reference signals.

Further, the present invention provides an effect of measuring an accurate position when the UE is located indoors.

MODE FOR CARRYING OUT THE INVENTION

Figure 1:
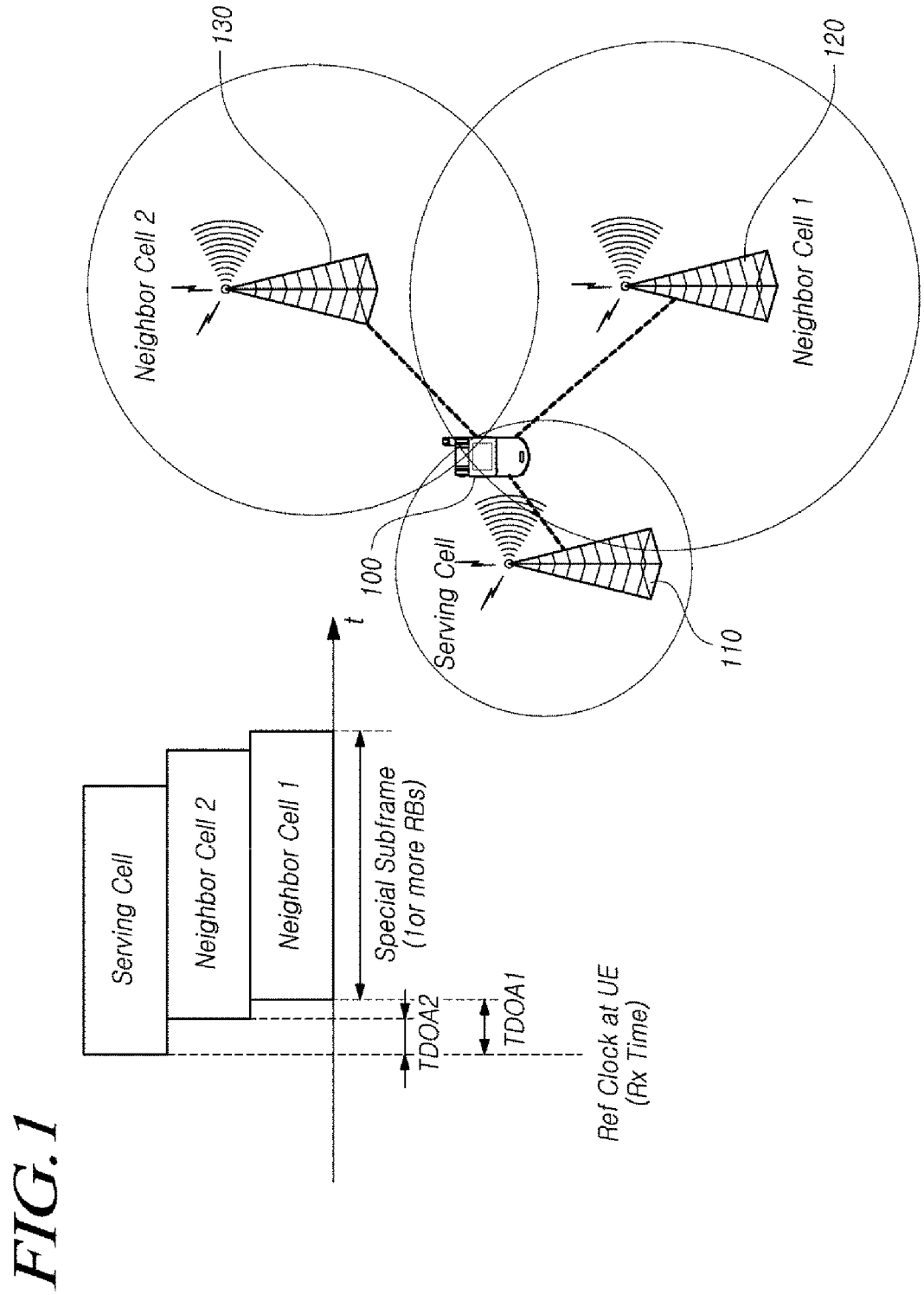
FIG. 1 illustrates a method of estimating a position of a UE according to an OTDOA scheme.

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In the present specifications, a MTC terminal refers to a terminal that is low cost (or is not very complexity), a terminal that supports coverage enhancement, or the like. In the present specifications, the MTC terminal refers to a terminal that supports low cost (or low complexity) and coverage enhancement. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type.

The wireless communication system may be widely installed so as to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in WCDMA, LTE, HSPA, and the like, and an MS (Mobile station), a UT (User Terminal), an SS (Subscriber Station), a wireless device, and the like in GSM.

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station 20 or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell, and thus, the base station may be construed in two ways. i) The base station may be a device itself that provides a mega cell, a macro cell, a micro cell, a pico cell, a femto cell, and a small cell in association with a wireless area, or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. In ii), a wireless area itself that receives or transmits a signal from a perspective of a terminal or a neighboring base station, may be indicated as a base station.

Therefore, a mega cell, a macro cell, a micro cell, a pico cell, a femto cell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink) inclusive transceiving subjects to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present invention may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present invention may not be limited to a specific wireless communication field, and may include all technical fields in which the technical idea of the present invention is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, so as to transmit data.

Control information may be transmitted using an EPDCCH (enhanced PDCCH or extended PDCCH).

In this specification, a cell may refer to a component carrier, which has the coverage of a signal transmitted by a transmission/reception point or that of a signal transmitted by a transmission point or the transmission/reception point, and the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multiple transmission/reception points to a UE, and an uplink refers to communication or a communication path from a UE to multiple transmission/reception points. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present invention, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

Method of Estimating Position of UE

A need for methods of estimating a position of a UE has increased due to the use of various applications in a recent real life. Among the methods of estimating the position of the UE, widely known methods may be largely divided into a GPS (Global Positioning System)-based scheme and a terrestrial positioning-based scheme.

The GPS-based scheme corresponds to a scheme of measuring a position of a UE through satellites and requires signals transmitted from at least four satellites. Accordingly, the GPS-based scheme cannot be used in an indoor environment. Meanwhile, the terrestrial positioning-based scheme corresponds to a method of measuring the position of the UE based on reception timing difference between signals transmitted from Base Stations (BSs) and requires signals transmitted from at least three BSs. The terrestrial positioning-based scheme has a lower location estimation performance compared to the GPS-based scheme, but can be used in almost all environments. In the terrestrial positioning-based scheme, the position of the UE is estimated mainly using a synchronization signal or a reference signal. Further, the terrestrial positioning-based scheme may be defined by various terms. For example, the terrestrial positioning-based scheme is defined as OTDOA (Observed Time Difference Of Arrival) in a UTRAN (UMTS Terrestrial Radio Access Network), defined as E-OTD (Enhanced Observed Time Difference) in a GERAN (GSM/EDGE Radio Access Network), and defined as AFLT (Advanced Forward Link Trilateration) in CDMA2000. In this specification, the terrestrial positioning-based scheme is used with the meaning including such various terms and there are no limitations on the term.

FIG. 1 illustrates a method of estimating a position of a UE according to an OTDOA scheme.

As illustrated in FIG. 1, a UE 100 performs a reference clock based on a subframe transmitted in a current serving cell 110, and thus signals received from neighboring cells 120 and 130 have different TDOAs.

For example, a method of determining a position of the UE 100 using OTDOA will be described. A reference cell may be the serving cell 110, or a serving cell before a handover operation when the UE 100 performs the handover operation, or may not be changed regardless of the handover operation of the UE 100. The method of estimating the position of the UE may be performed through a Common Reference Signal (CRS) or synchronization signals (Primary Synchronization Signal (PSS)/Secondary Synchronization Signal (SSS)) or may define and use a Positioning Reference Signal (RRS) dedicated for a LCS (LoCation Service). The UE 100 may estimate the position by calculating a difference between a time spent for receiving a signal from one serving cell 110 and a time spent for receiving a signal from each of a plurality of neighboring cells 120 and 130 by using the positioning reference signal or synchronization signals received from one reference cell 110 and the plurality of neighboring cells 120 and 130. For example, the UE according to the present invention may transmit information on the difference between the reception times to an Enhanced-Serving Mobile Location Center (E-SMLC). The E-SMLC may calculate the position of the UE 100 by solving a linearlized equation using a Taylor series expansion based on the received information on the time difference. Information on the position of the UE 100 may be transmitted to the UE 100. Alternatively, the UE 100 according to the present invention may estimate the position by itself based on the time difference between reception signals without transmission of additional information to the E-SMLC.

Figure 2:
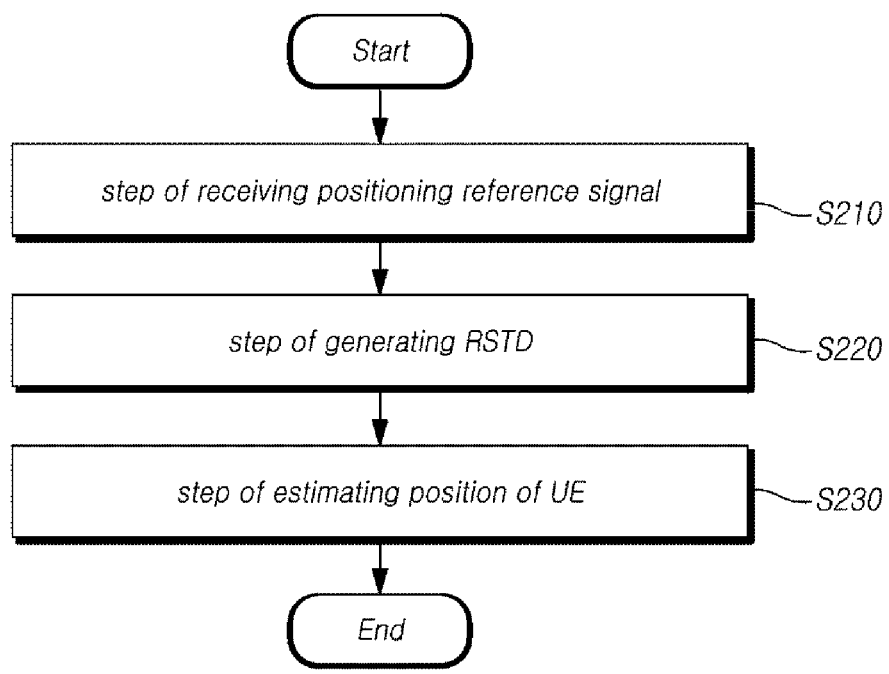
FIG. 2 is a flowchart illustrating an operation of estimating a position of a UE according to an embodiment of the present invention.

FIG. 2 is a flowchart illustrating an operation of estimating a position of a UE according to an embodiment of the present invention.

The UE according to an embodiment of the present invention may include a step of receiving positioning reference signals from a serving cell and each of one or more neighboring cells, a step of generating Reference Signal Time Difference (RSTD) information based on reception time information of the positioning reference signals, and a step of estimating a position of the UE based on the reference signal time difference information.

Referring to FIG. 2, the UE according to the present invention includes a step of receiving the positioning reference signals from the serving cell and each of the one or more neighboring cells in S210. The UE receives the positioning reference signal for estimating the position from the serving cell. Further, the UE receives the positioning reference signal from each of the one or more neighboring cells. In this case, the positioning reference signals may be received based on preset positioning reference signal configuration information.

For example, the UE may receive information on a positioning reference signal configuration index from the serving cell. The positioning reference signal configuration index includes index information corresponding to the preset positioning reference signal configuration information. The UE may identify the positioning reference signal configuration information corresponding to the received positioning reference signal configuration index and receive the positioning reference signal according to the corresponding positioning reference signal configuration information.

The positioning reference signal configuration information may include at least one piece of information on a transmission period of the positioning reference signal required for receiving the positioning reference signal by the UE, subframe offset information for transmitting the positioning reference signal, and information on a transmission subframe for transmitting the positioning reference signal. Each piece of the information included in the positioning reference signal configuration information will be described below in more detail.

Further, the UE according to the present invention includes a step of generating Reference Signal Time Difference (RSTD) information based on reception time information of the positioning reference signals in S220. The UE identifies information on reception times of positioning reference signals received from the serving cell and each neighboring cell and calculates information on a difference between the reception times of the positioning reference signals. Information on the reception time difference between the positioning reference signals will be described as RSTD information. For example, the difference between the reception time of the positioning reference signal transmitted by the serving cell 110 and the reception time of the positioning reference signal transmitted by neighboring cell #2 130 is calculated as TDOA2 in FIG. 1. Similarly, the difference between the reception time of the positioning reference signal transmitted by the serving cell 110 and the reception time of the positioning reference signal transmitted by neighboring cell #1 120 is calculated as TDOA1 in FIG. 1. As described above, the UE generates RSTD information based on the information on the reception time difference between the positioning reference signals transmitted by the reference cell (for example, the serving cell) and neighboring cells.

Further, the UE according to the present invention includes a step of estimating the position of the UE based on reference signal time difference information in S230. The UE may estimate the position of the UE based on the RSTD information. A detailed method of estimating the position of the UE based on the RSTD information has no limitations. For example, a triangulation method may be used based on position information of each cell, which transmits the positioning reference signal, and the RSTD information. Alternatively, the position may be estimated using the linearized equation in OTDOA.

As described above, the UE may estimate the position of the UE by receiving the positioning reference signals.

Meanwhile, the UE may estimate the position of the UE by itself based on the RSTD, or the UE may transmit the RSTD information to a location server and the location server may estimate the position of the UE. To this end, the UE may transmit the RSTD information to the serving cell. Thereafter, the UE may receive information on the position of the UE estimated by the location server of the serving cell from the serving cell.

The UE according to the present invention may be located at a place where the positioning reference signal cannot smoothly reach such as the inside of a building. To this end, the present invention describes a method by which the UE changes various pieces of information in the positioning reference signal configuration information and receives the positioning reference signal.

First, the Positioning Reference Signal (PRS) will be described in more detail.

The PRS corresponds to a reference signal used for determining the position of the UE and is transmitted only through resource blocks of a downlink subframe determined for PRS transmission.

A PRS sequence may be defined as equation (1).

$$r_{l,n_s}(m) = \frac{1}{\sqrt{2}}(1 - 2 \cdot c(2m)) + j\frac{1}{\sqrt{2}}(1 - 2 \cdot c(2m)), \quad \text{equation (1)}$$

$$m = 0, 1, \ldots, 2N_{RB}^{max,DL} - 1$$

In equation (1), $r_{l,n_s}(m)$ denotes a PBS sequence, $n_s$ denotes a slot number within a radio frame, and l denotes an OFDM symbol number within a slot. c(i) denotes a pseudo-random sequence and a pseudo-random sequence generator is initialized as $c_{init}$ as shown in equation (2) at a starting point of each OFDM symbol. Further, $N_{RB}^{max,DL}$ denotes a maximum downlink bandwidth that can be represented by the number of subcarriers.

$$c_{init} = 2^{10} \cdot (7 \cdot (n_s+1)+l+1) \cdot (2 \cdot N_{ID}^{cell}+1) + 2 \cdot N_{ID}^{cell} + N_{CP} \quad \text{equation (2)}$$

In equation (2), $N_{ID}^{cell}$ denotes a physical layer cell ID, and $N_{CP}$ is 1 when an OFDM symbol has a normal Cyclic Prefix (CP) and is 0 when the OFDM symbol has an extended CP.

The sequence of the positioning reference signal may be determined through equations (1) and (2) above.

Figure 3:
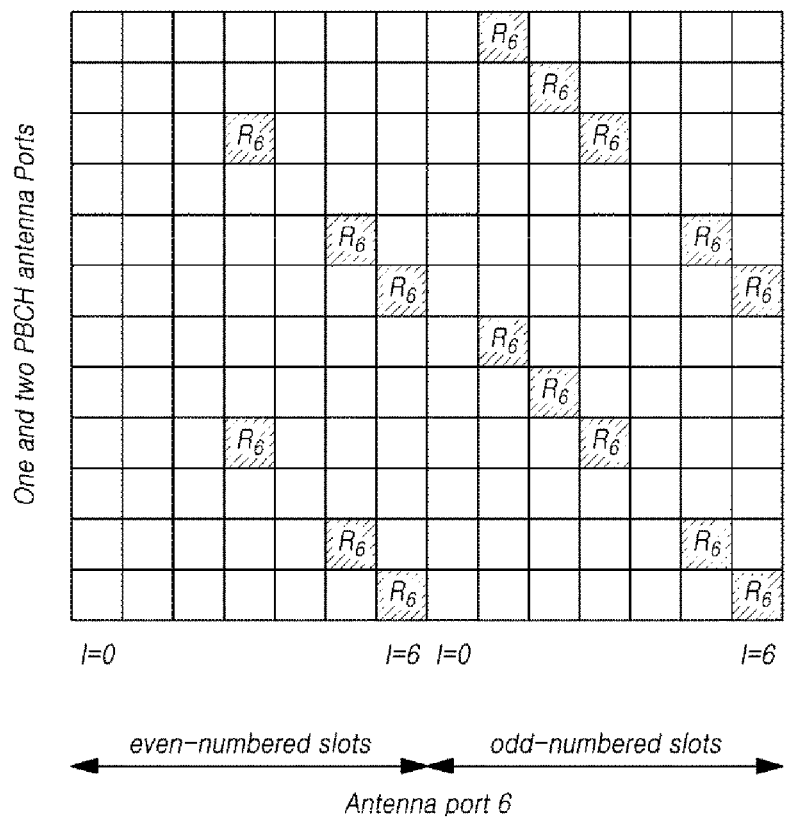
FIG. 3 illustrates a resource element allocation pattern of a positioning reference signal.

FIG. 3 illustrates a resource element allocation pattern of the positioning reference signal. FIG. 3 shows resource elements in which positioning reference signals transmitted through antenna port 6 are allocated within one subframe in a case of the normal CP. As illustrated in FIG. 3, the positioning reference signal may be hopped and transmitted in the unit of frequencies.

Meanwhile, in order to allow the UE to smoothly receive the positioning reference signal even when the position of the UE is not suitable for signal reception such as the inside of a building or a basement, configuration information of the positioning reference signal according to the present invention may be dynamically changed.

To this end, the UE according to the present invention may receive positioning reference signal index information from the serving cell and receive the positioning reference signal based on the positioning reference signal configuration information corresponding to the corresponding index. An example of the positioning reference signal configuration information corresponding to the positioning reference signal index information is shown in [Table 1].

TABLE 1

| PRS configuration Index $I_{PRS}$ | PRS periodicity $T_{PRS}$ (subframes) | PRS subframe offset $\Delta_{PRS}$ (subframes) |
| --- | --- | --- |
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-4095 | Reserved | |

Referring to [Table 1], a PRS transmission period and subframe offset information correspond to each positioning reference signal index (IPRS).

Additionally, in the present invention, the cell transmitting positioning reference signal may dynamically change a positioning reference signal transmission period, transmission subframe, or transmission power in order to improve a positioning reference signal reception rate of the UE.

First, the transmission period of the positioning reference signal is described.

Figure 4:
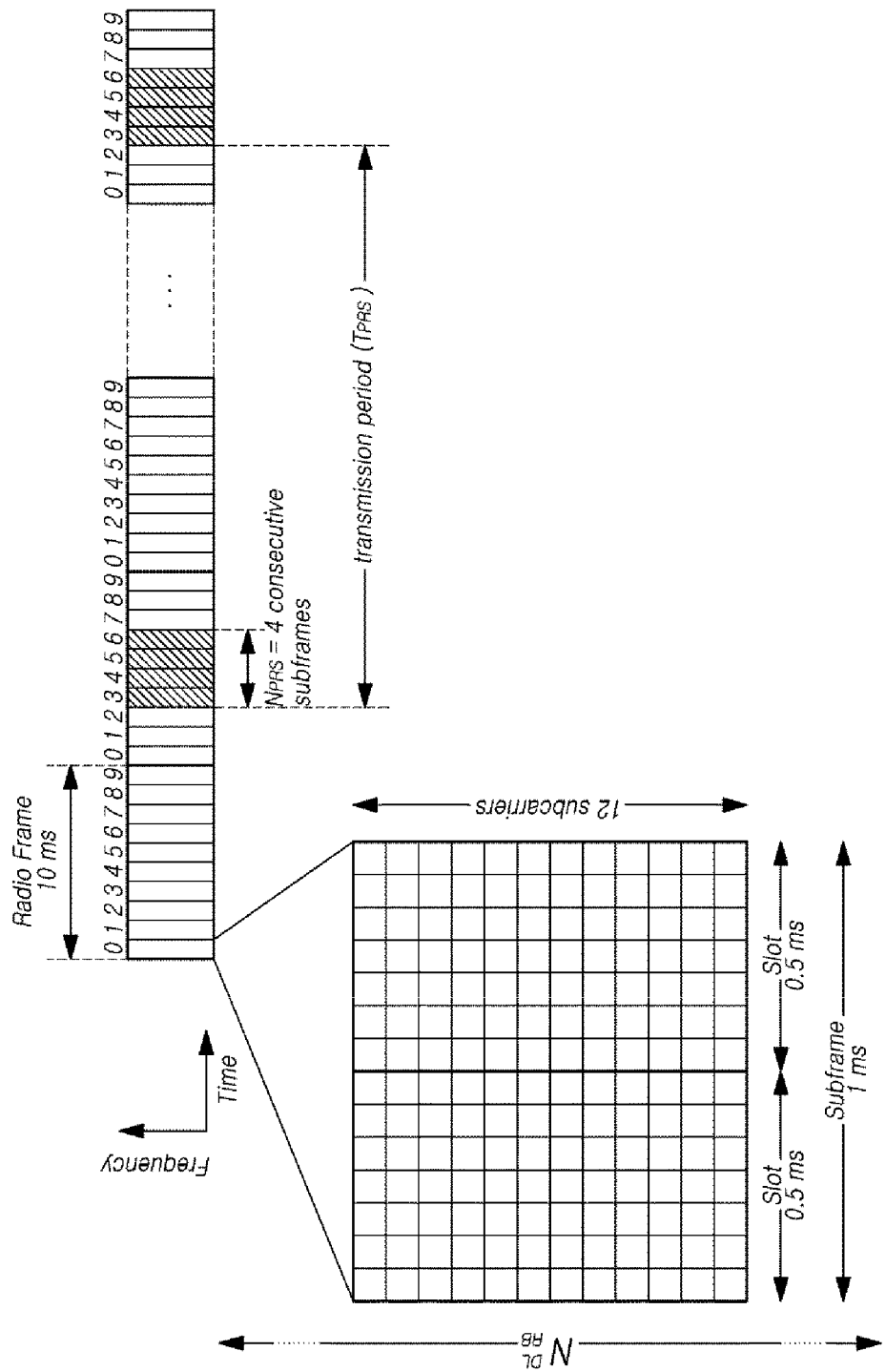
FIG. 4 illustrates a method of transmitting a positioning reference signal according to an embodiment of the present invention.

FIG. 4 illustrates a method of transmitting a positioning reference signal according to an embodiment of the present invention.

Referring to FIG. 4, the positioning reference signal may be transmitted in some radio frames on a preset transmission period. Specifically, when the transmission period is 40 ms, the positioning reference signal may be transmitted in the unit of 4 radio frames.

For example, the positioning reference signal may be received on a transmission period set as the product of 40 ms and N, and N may be one of 1, 4, 8, 16, and 32. For example, the transmission periods shown in [Table 1] may further include the transmission period of 40 ms. Further, a positioning reference single index corresponding to the transmission period 40 ms may be set. Alternatively, the positioning reference signal transmission period may be set as an integer multiple of 40 ms, and each cell may transmit the positioning reference signal on the transmission period set as the integer multiple of 40 ms.

In another example, the cell may transmit the positioning reference signal on a first transmission period and additionally transmit the positioning reference signal for the UE located inside the building intermittently on a second transmission period. For example, the cell may transmit the positioning reference signal on a transmission period of 160 ms, and a transmission period of an $n^{th}$ transmission positioning reference signal may be set to be shorter. That is, the cell may transmit the positioning reference signal on the first transmission period 160 ms and then additionally transmit an $m^{th}$ positioning reference signal on a preset second transmission period between transmission of fourth and fifth positioning reference signals. Accordingly, the UE may more smoothly receive the positioning reference signals.

Meanwhile, the positioning reference signal may be repeatedly transmitted through a plurality of subframes within one radio frame.

For example, the positioning reference signal may be repeatedly transmitted in K successive subframes. FIG. 4 illustrates an example of a case where K is 4. That is, a subframe position at which transmission of the positioning reference signal starts within one radio frame is determined according to subframe offset information, and the positioning reference signal may be successively transmitted through K subframes from the corresponding position. Referring to FIG. 4, the positioning reference signal may be transmitted in subframes nos. 3, 4, 5, and 6.

In another example, the number of subframes in which the positioning reference signal is successively transmitted may vary depending on each radio frame. This makes the UE more smoothly receive the positioning reference signal by increasing the number of times the positioning reference signal is repeatedly transmitted while reducing a waste of radio resources. For example, in a case of a positioning reference signal having a transmission period of 40 ms, the positioning reference signal is repeatedly transmitted through two subframes in a first transmission radio frame and repeatedly transmitted through four subframes in a second transmission radio frame.

Meanwhile, transmission power of positioning reference signals of the present invention may be dynamically set.

Figure 5:
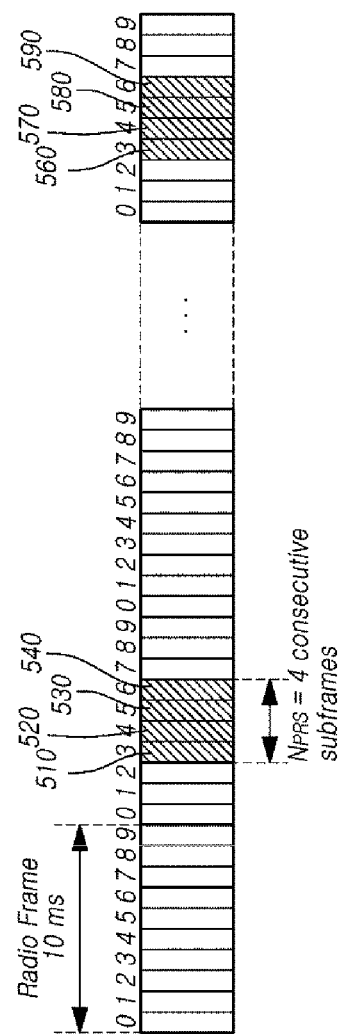
FIG. 5 illustrates allocation of transmission power of a positioning reference signal according to an embodiment of the present invention.

FIG. 5 illustrates allocation of transmission power of a positioning reference signal according to an embodiment of the present invention.

For example, each cell may set transmission power of the positioning reference signal to be relatively higher than that of other reference signals (for example, a CSR, a DM-RS, and the like). Specifically, the transmission power of the positioning reference signal may be set to be high on a particular period. For example, the transmission power of the positioning reference signal may be set to become higher by a predetermined value on a period of four radio frames.

In another example, the positioning reference signal may be transmitted with the transmission power which is set such that transmission power in an $L^{th}$ subframe is higher than transmission power in an $L-1^{th}$ subframe among K successive subframes within one radio frame. In this case, L is a natural number from 2 to K. Referring to FIG. 5, K is 4 and L is 2, 3, or 4. Accordingly, transmission power of the positioning reference signal transmitted in a subframe 520 may be set to be higher than transmission power of the positioning reference signal transmitted in a subframe 510. Similarly, transmission power of the positioning reference signal transmitted in a subframe 530 may be set to be higher than transmission power of the positioning reference signal transmitted in the subframe 520. Further, transmission power of the positioning reference signal transmitted in a subframe 540 may be set to be higher than transmission power of the positioning reference signal transmitted in the subframe 530. In this case, transmission power of the positioning reference signal transmitted in the subframe 510 may be the same as transmission power of the positioning reference signal transmitted in a subframe 560. Similarly, 520 may be the same as 570, 530 may be the same as 580, and 540 may be the same as 590.

In another example, transmission power of the positioning reference signal may increase in the unit of radio frames and, simultaneously, transmission power of the positioning reference signal within one radio frame may increase. That is, transmission power of a radio frame may increase on a predetermined period and, in this case, transmission power in each subframe within the same radio frame may increase.

In another example, only in a case of a particular transmission period, transmission power may increase for transmission.

As described above, at least one of the transmission period, the number of transmission subframes, and the transmission power of the positioning reference signal of the present invention may be dynamically set. Further, respective embodiments may be combined and implemented.

Meanwhile, when estimating a position, the UE of the present invention may receive a parameter for estimating a 3D position. For example, when a plurality of small cells or Radio Units (RUs) are distributed within a building, information on a location of the corresponding small cell or RU may be transmitted to the UE through the parameter in order to identify information on a location of the UE such as a floor on which the UE is located. Accordingly, the UE may additionally receive the positioning reference signal received from the small cell or the RU, the positioning reference signal received from the serving cell, and information on positions of each small cell, the RU, and the serving cell through the parameter, so as to estimate a 3D position of the UE.

In the above, a position estimation method through the dynamic setting of the positioning reference signal when a signal reception environment of the UE is bad has been described according to each embodiment of the present invention.

For the location estimation, the BS may perform the measurement based on the reference signal transmitted by the UE. This is referred to as UTDOA. Each embodiment of the present invention may be applied to the UTDOA based on the technical idea of dynamically setting configuration information of the reference signal which is the standard of position estimation to increase the estimation accuracy. However, in this case, a sounding reference signal (SRS) may be used as the positioning reference signal, and a subject for transmitting the positioning reference signal is the UE and a subject for receiving the positioning reference signal is the BS.

Hereinafter, a case where the UTDOA scheme is used will be described with reference to the accompanying drawings.

Another example of the above-described terrestrial position estimation method includes a UTDOA scheme using Uplink Time Delay Of Arrival (UTDOA) measurement. Specifically, the position of the UE may be determined using uplink time delay of arrival measurements for reference signals (for example, sounding reference signals) transmitted from the UE to the serving cell and two or more neighboring cells. Since neighboring cells are not selected as the serving cell, the UE is highly likely to be located near edges of the neighboring cells or even outside cell boundaries. Accordingly, a strength of the reference signal transmitted from the UE and received by neighboring cells is relatively lower than a strength of a signal transmitted from a second UE operating within the neighboring cells and/or served by the neighboring cells and received by neighboring cells.

Therefore, the present invention proposes a method and an apparatus for more efficiently transmitting and receiving the positioning reference signal to estimate a position of the UE through the UTDOA scheme. Hereinafter, the sounding reference signal is described as an example of the positioning reference signal transmitted by the UE, but the present invention is not limited thereto.

Figure 6:
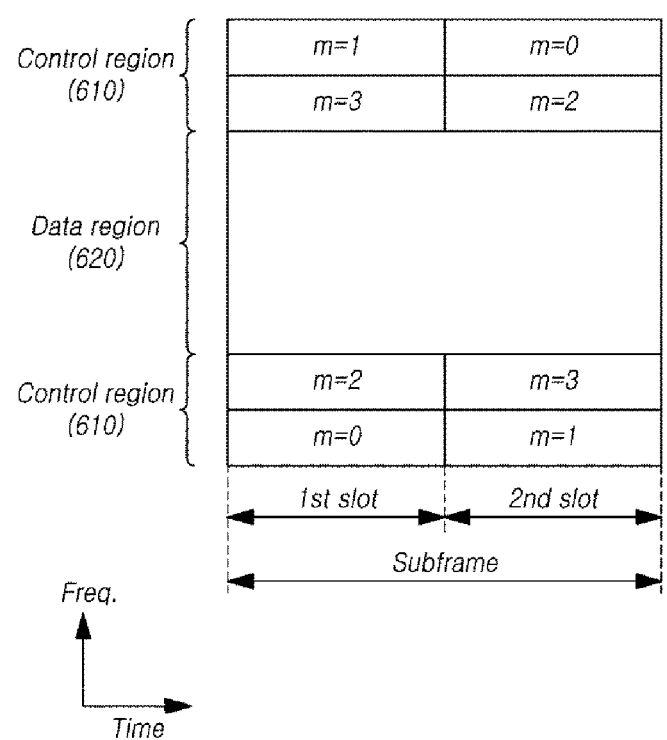
FIG. 6 illustrates a structure of an uplink subframe used in a UTDOA scheme.

FIG. 6 illustrates a structure of an uplink subframe used in a UTDOA scheme.

Referring to FIG. 6, an uplink subframe may be divided into a control area 610 to which a Physical Uplink Control Channel (PUCCH) carrying an uplink control signal is allocated and a data area 620 to which a Physical Uplink Shared Channel (PUSCH) carrying user data is allocated. In SC-FDMA, successive resource blocks in a frequency domain are allocated to one UE to maintain a single subcarrier characteristic.

The PUCCH is allocated to one UE as a pair of RBs in a subframe. RBs included in a pair of RBs occupy different subcarriers in each of a first slot and a second slot. This corresponds to frequency hopping of a pair of RBs allocated to the PUCCH in a slot boundary. m denotes a position index indicating a frequency domain position of the RB allocated to the PUCCH within the subframe.

The PUCCH is mapped to an Uplink Shared Channel (UL-SCH) corresponding to a transport channel. An uplink control signal transmitted on the PUCCH includes a Hybrid Automatic Repeat and request (HARQ), an Acknowledgement/Negative-Acknowledgement (ACK/NACK) signal, a Channel Quality Indicator (CQI) indicating a downlink channel state, and a Scheduling Request (SR) corresponding to an uplink radio resource allocation request. The PUCCH may support multiple formats. That is, according to a modulation scheme, uplink control signals having different numbers of bits per subframe may be transmitted. For example, when Binary Phase Shift Keying (BPSK) is used, 1 bit uplink control information may be transmitted on the PUCCH. When Quadrature Phase Shift Keying (QPSK) is used, a 2 bit uplink control signal may be transmitted on the PUCCH.

Sounding Reference Signal

Hereinafter, a method of transmitting a sounding reference signal (SRS) is described. The sounding reference signal is a reference signal which the UE transmits to the BS for uplink scheduling. The BS estimates an uplink channel through the received sounding reference signal and uses the estimated uplink channel for uplink scheduling.

Figure 7:
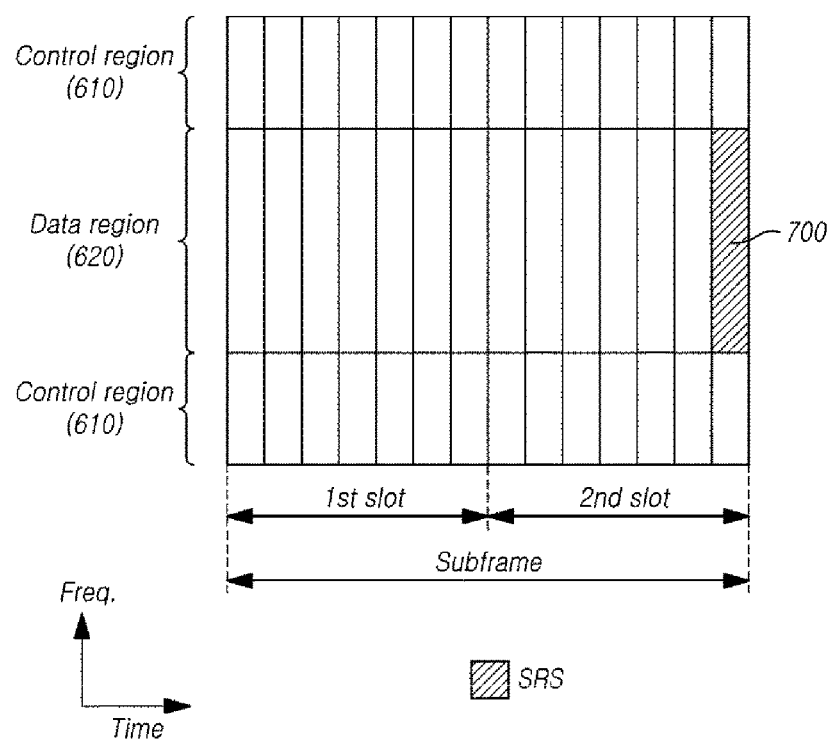
FIG. 7 illustrates an example of a subframe in which a sounding reference signal is transmitted.

FIG. 7 illustrates an example of a subframe in which a sounding reference signal is transmitted. Referring to FIG. 7, the sounding reference signal is transmitted through one SC-FDMA symbol 700 within a subframe. Hereinafter, the SC-FDMA symbol 700 in an interval where the sounding reference signal is transmitted is referred to as a sounding symbol. Here, the last SC-FDMA symbol 700 among 14 SC-FDMA symbols of the subframe is the sounding symbol, but it is only an example and a location or the number of sounding symbols within the subframe may be variously changed.

The sounding reference signal is not transmitted in a control area, but is transmitted in a data area. The UE may transmit the sounding reference signal over the enter frequency (or subcarrier) of the data area or over some frequencies of the data area.

When the UE transmits the sounding reference signal over some frequencies, the sounding reference signal may be hopped and transmitted over different frequencies in every subframe where the sounding reference signal is transmitted. Further, the UE may transmit the sounding reference signal using only subcarriers of even-numbered or odd-numbered indexes. The UE may periodically or aperiodically transmit the sounding reference signal.

The sounding reference signal may be transmitted in the form generated by applying a particular cyclic shift value to a basic sequence. The basic sequence may include a PN sequence, a ZC sequence, or a CAZAC sequence generated through a computer.

In a position estimation method of a UTDOA scheme, the position may be estimated using an SRS.

However, when buildings are concentrated like in a city environment or when the user is located inside a building, an SRS which the UE transmits may not be properly delivered to the BS. Further, in a non-serving cell in which the UE does not currently perform communication, an interference phenomenon due to an SRS may be generated. Accordingly, in this case, it may be difficult to accurately estimate the position of the UE. Particularly, when the UE is located inside the building, there is some difficulty in estimating the position through a satellite such as a GNSS, so that a method of estimating an accurate position of the UE located inside the building is required.

Conventional SRS main parameters are shown in [Table 2] to [Table 5]. [Table 2] shows $m_{SRS,b}$, $N_b$ (b=0, 1, 2, 3) in $6 \leq N^{UL}_{RB} \leq 40$, [Table 3] shows $m_{SRS,b}$, $N_b$ (b=0, 1, 2, 3) in $40 \leq N^{UL}_{RB} \leq 60$, [Table 4] shows $m_{SRS,b}$, $N_b$ (b=0, 1, 2, 3) in $60 \leq N^{UL}_{RB} \leq 80$, and [Table 5] shows $m_{SRS,b}$, $N_b$ (b=0, 1, 2, 3) in $80 \leq N^{UL}_{RB} \leq 100$.

TABLE 2

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 3

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 4

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 5

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

However, in estimating the position of the UE based on the conventional SRS as described above, when the UE is located inside the building, an SRS arrival range may be reduced by a wall of the building or various objects.

Accordingly, in order to solve the problem, it is required to newly design the conventional SRS.

The UE according to an embodiment of the present invention may dynamically set SRS main parameters similarly to a method of estimating the position by dynamically setting a PRS.

The UE may dynamically control a transmission period of the SRS.

For example, the UE may set the transmission period of the SRS to be shorter and more frequently transmit the SRS to the BS. For example, the transmission period of the SRS may be set to be an integer multiple of 5 ms, and the UE may transmit the SRS on the transmission period set to be the integer multiple of 5 ms.

In another example, the UE may transmit the SRS on the conventional transmission period, and the UE located inside the building may intermittently transmit the SRS on an additional scheduling period. That is, the UE may transmit the SRS on the conventional transmission period, but may set a transmission period of an $n^{th}$ SRS to be shorter. For example, between fourth and fifth SRS transmissions, an $m^{th}$ SRS may be transmitted on a preset transmission period.

The UE may widen a transmission bandwidth of the SRS and transmit the SRS. For example, the UE may dynamically change the transmission bandwidth of the SRS within a range no larger than an uplink transmission bandwidth.

Alternatively, the UE may set transmission power for SRS transmission to be higher than that of other reference signals.

For example, the UE may ramp up the SRS transmission power by a pre-stored value corresponding to a predetermined number of times according to the transmission period. That is, when five is set as the period, the SRS transmission power may be allocated such that second transmission power is increased by a preset value from first transmission power. Similarly, a third transmission power may be set to be higher than the second transmission power.

In another example, in a case of a particular transmission period, transmission power may be changed according to the SRS transmission period. Alternatively, only when an SRS transmission period is newly added and the SRS is transmitted on the added SRS transmission period, SRS transmission power may be changed.

The UE may repeatedly transmit the SRS.

For example, the UE may repeatedly transmit the SRS by a predetermined number of times and may set a repetition level. That is, when the BS cannot receive the SRS, the SRS may be repeatedly transmitted k times according to a next repetition level.

In another example, the UE may transmit the SRS based on a combination of the above-described repetition level and transmission power change. For example, even though the UE transmitted the SRS while increasing the repetition level, when the BS has not received the SRS and the repetition level reaches a maximum repetition level, the UE may ramp up transmission power and transmit the SRS. In this case, the repetition level may be changed to an initial repetition level or may remain in the maximum repetition level. The number of repetitions of the SRS may be repeatedly set within a particular radio frame and may be repeated over a plurality of radio frames.

Meanwhile, in allocating resources of the SRS, the UE may modify a pattern thereof. For example, the pattern may be added to increase REs for the SRS in time-frequency resources or SRS resources may be mapped to reserved REs.

In addition, respective embodiments of setting the above-described SRS transmission method may be combined and set.

A UE configuration that may perform all of the methods of estimating the position of the UE described above will be briefly described.

Figure 8:
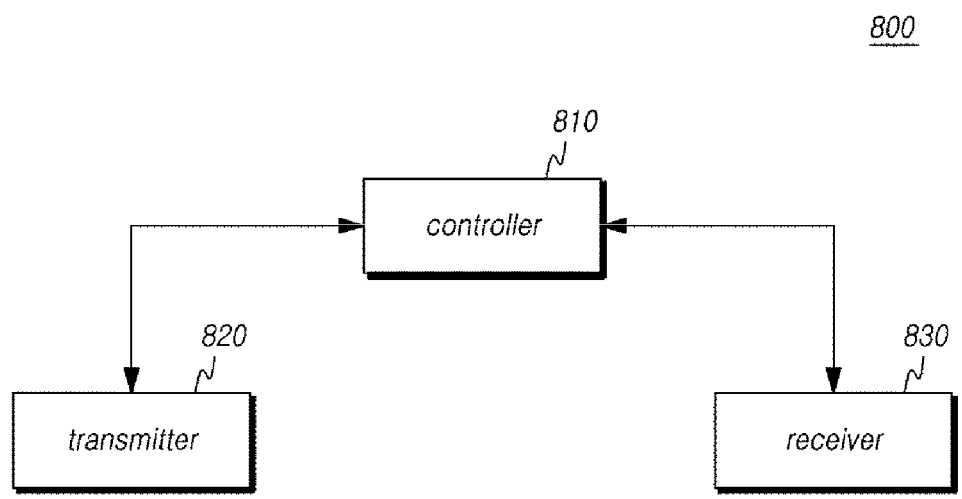
FIG. 8 illustrates a configuration of a UE according to an embodiment of the present invention.

FIG. 8 illustrates a configuration of a UE according to an embodiment of the present invention.

Referring to FIG. 8, a UE 800 according to an embodiment of the present invention includes a receiver 830 for receiving positioning reference signals from a serving cell and each of one or more neighboring cells, and a controller 810 for generating Reference Signal Time Difference (RSTD) information based on reception time information of the positioning reference signals and estimating a position of the UE based on the reference signal time difference information.

Further, the UE 800 may further include a transmitter 820 for transmitting the reference signal time difference information to the serving cell. The receiver 830 may receive position information of the UE estimated by a location server of the serving cell based on the reference signal time difference information.

Further, the receiver 830 may further receive a positioning reference signal configuration index, and may receive positioning reference signals from the serving cell and each of one or more neighboring cells based on the positioning reference signal configuration information. The controller 810 may identify preset positioning reference signal configuration information corresponding to the positioning reference signal configuration index.

In addition, the receiver 830 receives downlink control information, data, and messages from the BS through corresponding channels, and the transmitter 820 transmits uplink control information, data, and messages to the BS through corresponding channels. Moreover, the transmitter 820 may transmit the above-described uplink reference signal to the BS.

The controller 810 controls the general operation of the UE 800 attributable to the estimation of the position of the UE 800 by transmitting and receiving positioning reference signals required for implementing the present invention.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, exemplary aspects of the present invention have not been described for limiting purposes. The scope of the present invention shall be construed on the basis of the accompanying claims in such a manner that all of the technical ideas included within the scope equivalent to the claims belong to the present invention.

CROSS-REFERENCE TO RELATED APPLICATION

This application claims priority from and the benefit under 35 U.S.C. § 119(a) of Korean Patent Application Nos. 10-2014-0156924, 10-2014-0156928 & 10-2015-0158862 filed on Nov. 12, 2014, Nov. 12, 2014 and Nov. 12, 2015 which are hereby incorporated by reference for all purposes as if fully set forth herein. Also, when this application claims the priority benefit of the same Korean Patent Applications from countries in addition to the U.S., the disclosure will be incorporated herein by reference.

The invention claimed is:

1. A method of estimating a position of a User Equipment (UE), the method comprising:
    receiving positioning reference signals from a serving cell and each of one or more neighboring cells;
    generating Reference Signal Time Difference (RSTD) information based on reception time information of the positioning reference signals; and
    estimating the position of the UE based on the reference signal time difference information,
    wherein at least one of the positioning reference signals is repeatedly transmitted in a plurality of successive subframes, and
    wherein a number of the plurality of successive subframes is different between at least two successive radio frames of a same cell.

2. The method of claim 1, wherein the estimating the position of the UE comprises:
    transmitting the reference signal time difference information to the serving cell; and
    receiving position information of the UE estimated by a location server of the serving cell based on the reference signal time difference information.

3. The method of claim 1, wherein the receiving of the positioning reference signals comprises:
    receiving a positioning reference signal configuration index;
    identifying preset positioning reference signal configuration information corresponding to the positioning reference signal configuration index; and
    receiving the positioning reference signals from the serving cell and each of the one or more neighboring cells based on the positioning reference signal configuration information.

4. The method of claim 3, wherein the positioning reference signal configuration information includes at least one piece of transmission period information, subframe offset information, and transmission subframe information.

5. The method of claim 1, wherein the positioning reference signals are received on a transmission period set as a product of 40 ms and N, and N is one of 1, 4, 8, 16, and 32.

6. A method of estimating a position of a User Equipment (UE), the method comprising:
    receiving positioning reference signals from a serving cell and each of one or more neighboring cells;
    generating Reference Signal Time Difference (RSTD) information based on reception time information of the positioning reference signals; and
    estimating the position of the UE based on the reference signal time difference information,
    wherein at least one of the positioning reference signals is transmitted with transmission power allocated such that transmission power in an $L^{th}$ subframe of K successive subframes within one radio frame is higher than transmission power in an $L-1^{th}$ subframe, and L is a natural number from 2 to K.

7. A User Equipment (UE) for estimating a position, the UE comprising:
    a receiver configured to receive reference signals from a serving cell and each of one or more neighboring cells; and
    a controller configured to generate Reference Signal Time Difference (RSTD) information based on reception time information of the positioning reference signals and estimates the position of the UE based on the reference signal time difference information,
    wherein at least one of the reference signals is repeatedly transmitted in a plurality of successive subframes, and wherein a number of the plurality of successive subframes is different between at least two successive radio frames of a same cell.

8. The UE of claim 7, further comprising a transmitter configured to transmit the reference signal time difference information to the serving cell, wherein the receiver receives position information of the UE estimated by a location server of the serving cell based on the reference signal time difference information.

9. The UE of claim 7, wherein the receiver further receives a positioning reference signal configuration index, and receives the reference signals from the serving cell and each of the one or more neighboring cells based on the positioning reference signal configuration information, and the controller identifies preset positioning reference signal configuration information corresponding to the positioning reference signal configuration index.

* * * * *